Dec. 19, 1933.  H. B. ELY  1,939,675
FIRE CONTROL APPARATUS
Filed March 28, 1929   3 Sheets-Sheet 1
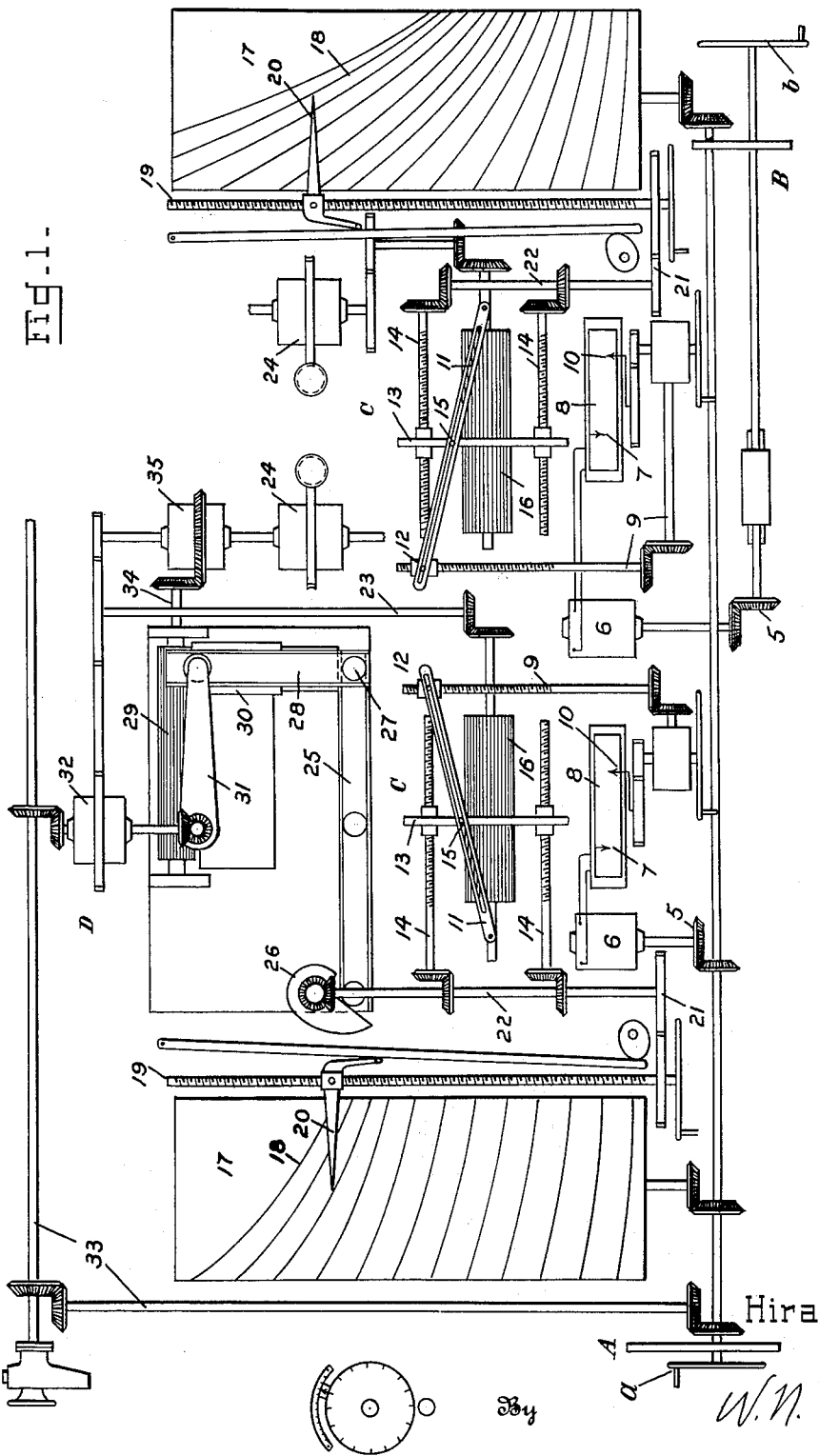
Inventor
Hiram B. Ely
By W. N. Roach
Attorney Dec. 19, 1933.　　　　　　H. B. ELY　　　　　　1,939,675
FIRE CONTROL APPARATUS
Filed March 28, 1929　　　3 Sheets-Sheet 2
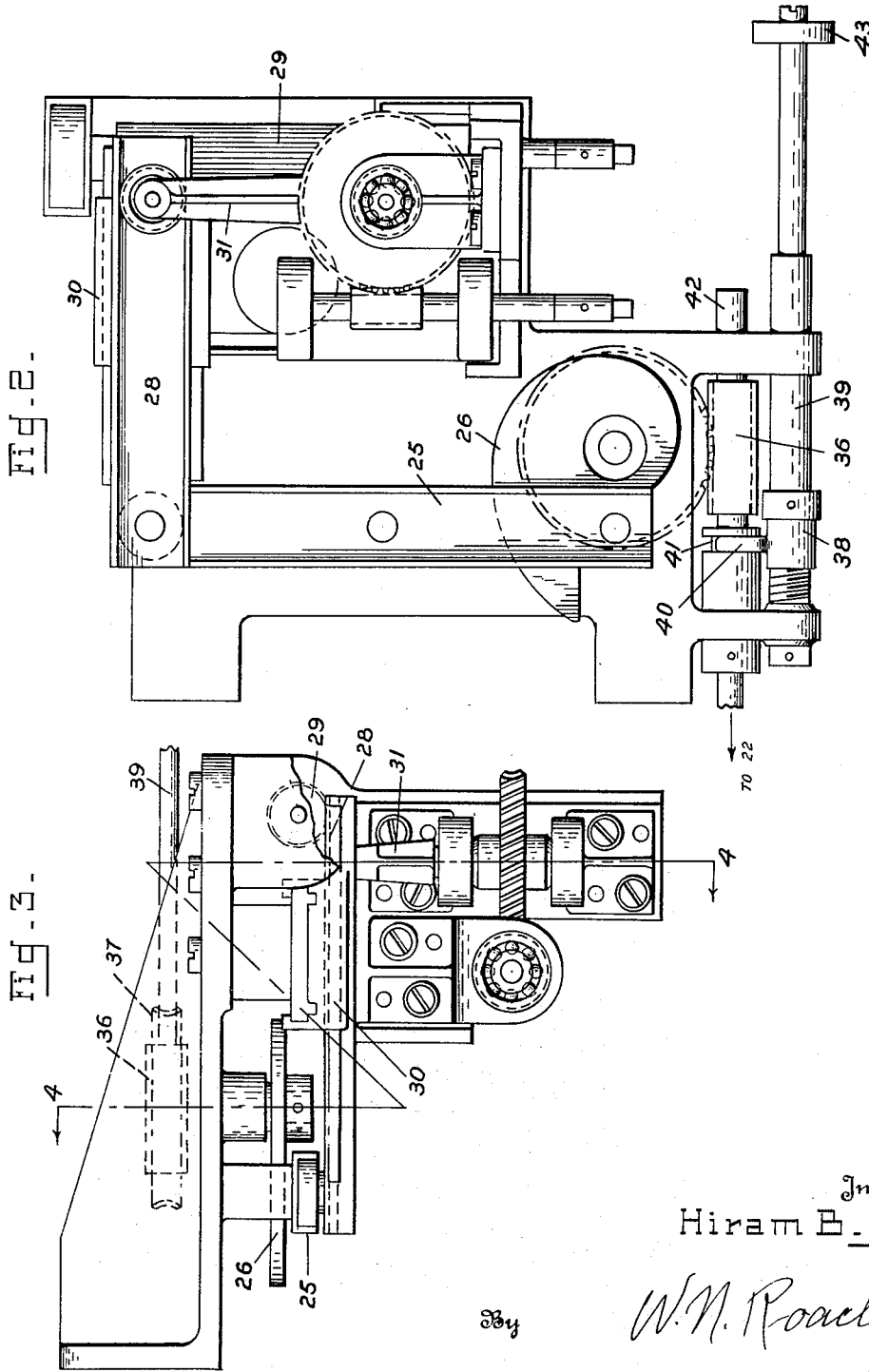
Inventor
Hiram B. Ely
By W. N. Roach.
Attorney Dec. 19, 1933.      H. B. ELY      1,939,675
FIRE CONTROL APPARATUS
Filed March 28, 1929      3 Sheets-Sheet 3

Inventor
Hiram B. Ely
By W. N. Roach
Attorney

Patented Dec. 19, 1933

1,939,675

UNITED STATES PATENT OFFICE 1,939,675

FIRE CONTROL APPARATUS

Hiram B. Ely, United States Army, New York, N. Y.

Application March 28, 1929. Serial No. 350,752

5 Claims. (Cl. 235—61.5)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to fire control apparatus particularly designed for securing data applicable to the sights of machine guns and operates according to the angular travel method wherein the vertical and lateral deflections are determined by obtaining a measure of the angular travels of the target vertically and laterally during one unit of time and multiplying these values by the time of flight of projectile.

In a known type of apparatus where the multiplication of the angular rate of travel and time of flight is performed electrically, the delicacy of the construction and the influence of climatic conditions contribute to render it unreliable and unsuited for field service. In the apparatus where the interpretation of the problem is performed mechanically, resort is had to variable speed mechanism employing a friction drive. This arrangement is also inaccurate and unsatisfactory.

In the present invention the angular rate of travel is indicated by electrical means while the determination of the time of flight, the multiplication of this factor with the angular travel, the resolution of super-elevation and the introduction of corrections are all performed by mechanical means.

The invention is characterized principally by a novel method of determining superelevation as a function of the time of flight and the cosine of the angular height. The arrangement is such that the time of flight mechanism may be adjusted for different guns.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a diagrammatic view of an apparatus embodying the principles of the invention;

Fig. 2 is a view in side elevation of the mechanism for determining superelevation;

Fig. 3 is a plan view thereof;

Figure 4:
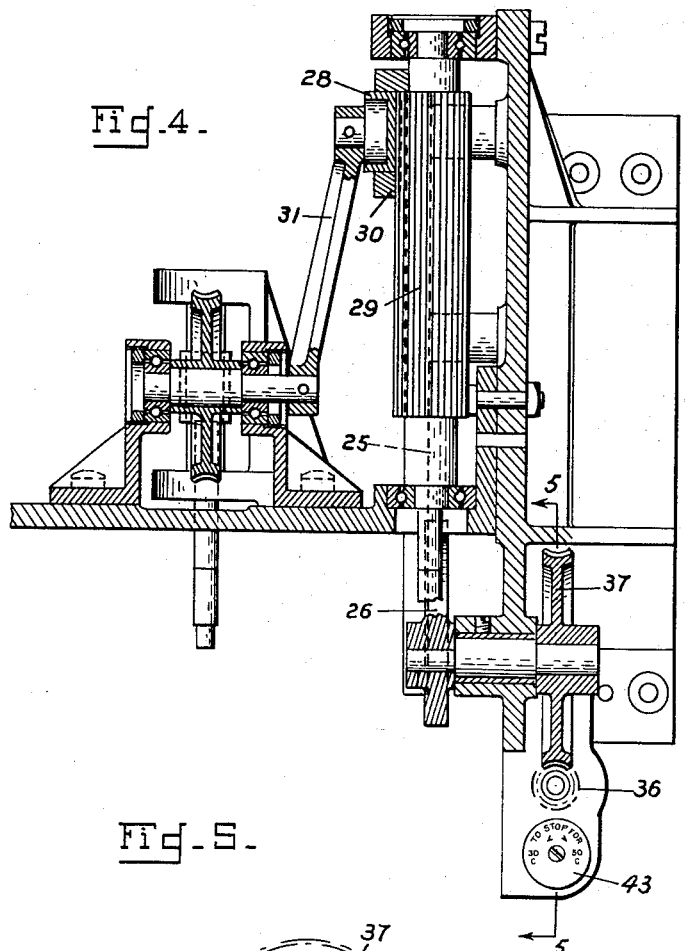
Fig. 4 is a sectional view on the general line 4—4 of Fig. 3.

Referring to Fig. 1, an apparatus is provided with two sighting means A and B which move in elevation and in azimuth, the movements being controlled by two hand wheels $a$ and $b$, the hand wheel $a$ acting in the accepted manner to elevate both telescopes. The rate of turning required to keep the sighting means on the target is a measure of the angular velocity of the target in the vertical and horizontal planes. The hand wheels each actuate a train of gears 5 which drives the armature of a magneto 6. The voltage thus generated being proportional to the speed of rotation of the armature, there is indicated by the pointer 7 of the voltmeter 8 a measure of the angular rate of movement of the sighting means or, in other terms, the angular velocity of the target in the prescribed plane. This measure is reproduced or converted into rotation of a rate shaft 9 by mechanically moving a pointer 10 to continuously follow or match the pointer 7 of the voltmeter. The rate shaft is connected with the rocker bar 11 of a multiplying mechanism C and has a sliding connection with a nut 12 on the shaft. This mechanism is of conventional design and includes a rack 13 mounted on parallel screw shafts 14—14 whereby it is movable with respect to the pivot of the bar 11. The rack 13 has a slidable connection 15 with the rocker bar and is moved thereby to actuate a pinion 16.

The displacement of the rack 13 along shafts 14—14 is a measure of the time of flight which is the multiplier. The means for determining this factor will be but briefly described as it forms the subject of a separate application. This mechanism which is duplicated to supply the data for the vertical and the lateral deflections consists of a cylinder 17 driven from the elevating hand wheel $a$ through gear 13 and, accordingly, rotatable proportionally to the present angle of sight to the target. The cylinder carries a chart 18 of curves of constant altitude plotted in function of time of flight and angle of sight. The amount of displacement of a screw shaft 19 necessary to move a pointer 20 to the curve of announced altitude will afford a measure of time of flight to be used as a multiplier when transmitted by means of the gearing 21 and shaft 22 to the parallel shafts 14—14.

The product of the multiplying mechanism which is the deflection and is represented in the movement of the pinion 16 is transmitted by the shaft 23 to a differential gearing 24 where arbitrary or secondary corrections may be introduced before recording or further communicating it.

The mechanism heretofore described is applicable in securing both the vertical and lateral deflections. The vertical deflections must in addition include an allowance for the angle of superelevation which is the vertical angle between the axis of bore and the plane of sight designed to cause the trajectory of the projectile to pass through the point at which the line of sight is directed. This angle varies with the range or the corresponding time of flight and also with the angle of sight.

Plotting arcs of constant time on the trajectory with range in yards as abscissæ, and altitudes in yards as ordinates, the arcs will, except for the more extreme ranges, closely approximate the quadrants of circles drawn from the origin as center. For that part of the trajectory where the time curves closely approximate circular arcs about the origin, superelevation may be shown to be a function of time and the cosine of the angular height.

The time curves may be plotted as a function of angular height (abscissæ) and superelevation (ordinates), and a mean straight line slope determined. The superelevation ordinate at any point along this straight line slope may be evaluated. This is accomplished by employing the ratio of corresponding sides of similar triangles. The ordinate at the extremity of a time line at the point of zero angular elevation with cosine equal to unity represents the maximum superelevation for that time. Multiplying this ordinate by the cosine of the actual angular height evaluates the superelevation ordinate at the desired point.

The exact materialization of the geometrical concept is illustrated by the mechanism D of Fig. 1. It consists of a lever 25 movable proportionally to the factor of time by means of a cam 26 operable by the shaft 22. The lever has a slidable connection 27 with a rack 28 which it moves across a pinion 29. The rack is slidably mounted in a carriage 30 arranged for reciprocating movement in the plane of rotation of the lever. The carriage is reciprocated by an arm 31 which moves proportionally to future angular height, a result which is obtained through a differential 32 which combines the present angular height transmitting through the shafting 33 from the elevating hand wheel $a$ and the vertical deflection transmitted by the shaft 23. The displacement of the carriage 30 is proportional to the cosine of the future angular height. Since the rack 28 is displaceable with the carriage 30 and is constrained by its connection 27 to move towards the pivot of the lever 25, its movement will be the reverse of that initially received from the lever 25. The resultant of the movements of the lever 25 and the arm 31 is to rotate the pinion 29 proportionally to superelevation and this rotation is transmitted by the shaft 34 to a differential 35 interposed in the line of transmission from the shaft 23 to the differential 24.

Figure 5:
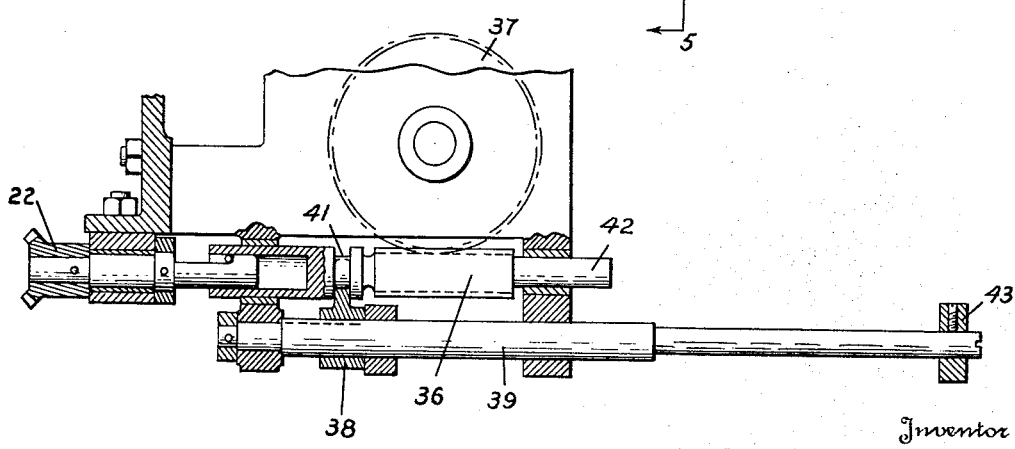
Fig. 5 is a sectional view on the line 5—5 of Fig. 4.

The mechanism as actually constructed is illustrated in Figs. 2 to 6, corresponding parts being designated by like characters. In addition, there is included means for altering the setting of the cam 26 and the lever 25 to adapt the superelevation apparatus D for guns of various calibers. This provision is made by interposing a slidable worm 36 between the drive shaft 22 and the worm wheel 37 on the cam. The movement of the worm is accomplished by a traveling nut 38 mounted on a screw shaft 39 and having a yoke 40 engaging in an annular groove 41 of the worm shaft 42. By turning the shaft 39 through the knob 43, the wheel 37 and the cam are angularly displaced a predetermined amount and move the lever 25 to a position corresponding to zero time of flight for a given gun.

This arrangement is rendered necessary by reason of the fact that the guns of larger caliber, greater range and higher muzzle velocity have a flatter trajectory and, consequently, require less superelevation for a given range.

Turning the cam 26 to rock the lever 25 to a new zero setting causes a difference in throw of the rack 28 for an equal movement of the arm 31 and an equal angular displacement of the cam 26. The resultant movement imparted to the pinion 29 and differential 35 will introduce into the result the proper superelevation.

I claim:

1. In a data computer, means for affording a measure of rate of change of position of an object, means for generating a value of a time of flight factor, means for combining the foregoing values to obtain a measure of deflection, a pivoted member displaceable proportionally to the time of flight factor, a pivoted member movable proportionally to present angular height, means for combining therewith the measure of deflection to afford a measure of future angular height, a reciprocable member actuated by the angular height member and movable proportionally to cosine of angular height and a member actuated jointly by the cosine and time of flight members to afford a measure of superelevation and means for combining the measures of superelevation and deflection.

2. In a fire control apparatus, a pivoted member, a cam for displacing the member an amount proportional to a time of flight factor, a gear fixed to the cam, a slidably mounted pinion meshing with the gear, means for sliding the pinion to angularly displace the gear and cam, and means for rotating the pinion.

3. In a fire control apparatus, a member, a cam engaging said member, a gear on the cam, a pinion meshing with the gear, means for rotating the pinion, and means for axially displacing the pinion to angularly displace the gear and cam and establish a zero setting of the cam appropriate for different guns.

4. In a data computer, a slidably mounted carriage, a rack on the carriage and reciprocable in a plane at right angles to the plane of movement of the carriage, a pivoted arm engageable with the rack to move the carriage, a pivoted member having a sliding engagement with the rack, and means for moving the pivoted member into and out of perpendicularity with respect to the rack.

5. In a data computer, a slidably mounted carriage, swinging means for moving the carriage, a rack on the carriage reciprocable in a plane at right angles to the plane of movement of the carriage, and means having a sliding engagement with the rack whereby the rack is reciprocated.

HIRAM B. ELY.